(12) United States Patent
Mizuno

(10) Patent No.: US 6,186,680 B1
(45) Date of Patent: Feb. 13, 2001

(54) SELF-DEVELOPING PHOTO FILM UNIT WITH TRAP MEMBER FOR TRAPPING SURPLUS DEVELOPING SOLUTION

(75) Inventor: Kazunori Mizuno, Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/392,781

(22) Filed: Sep. 9, 1999

(30) Foreign Application Priority Data

Sep. 10, 1998 (JP) .................................................. 10-256853
Mar. 15, 1999 (JP) .................................................. 11-068571

(51) Int. Cl.[7] ............................. G03B 17/26; G03D 9/02
(52) U.S. Cl. ............................................ 396/527; 396/583
(58) Field of Search .......................... 396/30, 583, 527; 206/455; 430/207, 499

(56) References Cited

U.S. PATENT DOCUMENTS

| 4,693,963 | * | 9/1987 | McCole | 396/583 |
| 4,735,886 | * | 4/1988 | Oshikoshi et al. | 396/583 |
| 4,985,334 | * | 1/1991 | Katoaka et al. | 396/583 |
| 4,985,335 | * | 1/1991 | Omote et al. | 396/583 |

* cited by examiner

*Primary Examiner*—D. Rutledge
(74) *Attorney, Agent, or Firm*—Sughrue, Mion, Zinn, Macpeak & Seas, PLLC (57) ABSTRACT

A self-developing photo film unit has a photosensitive sheet, first and second spacer rail members, a cover sheet, a mask sheet, a developing solution pod, and a strip-shaped trap member. The mask sheet has a mask portion, first and second bendback edge portions defined by being bent along first and second bend lines, and an aperture. The developing solution pod contains developing solution and is squeezed and enclosed between the first bendback edge portion and the mask portion. After the photosensitive sheet is exposed, the developing solution is spread from the developing solution pod between the photosensitive sheet and the cover sheet while being regulated between the first and second spacer rail members. The trap member is squeezed and enclosed between the second bendback edge portion and the mask portion, and captures a surplus part of the developing solution after the developing solution is spread. In the self-developing photo film unit, the trap member includes non-woven fabric having a porosity of 70% or more, including acid polymer impregnated therein, and having a first surface opposed to the second bendback edge portion, and a second surface having less acid polymer impregnated than the first surface. A securing region is disposed along one of two longer side lines of the trap member nearer to the aperture, and coated with adhesive agent, for securing the trap member to the second bendback edge portion.

16 Claims, 9 Drawing Sheets

SELF-DEVELOPING PHOTO FILM UNIT WITH TRAP MEMBER FOR TRAPPING SURPLUS DEVELOPING SOLUTION

BACKGROUND OF THE INVENTION

1. Field of the Invention

The present invention relates to a self-developing photo film unit. More particularly, the present invention relates to a self-developing photo film unit in which a trap member is reliably capable of capturing a surplus part of developing solution without enlarging a size of a portion wrapping the trap member.

2. Description Related to the Prior Art

There is a mono-sheet type of self-developing photo film unit for use with an instant camera. The photo film unit is constituted by a combination of a photosensitive sheet, a mask sheet, a cover sheet and the like. After the photosensitive sheet is exposed, a developing solution pod is squeezed and torn by spreader rollers of the instant camera. Developing solution, contained in the developing solution pod, is spread between the photosensitive sheet and the cover sheet. There occurs a surplus part of the developing solution in a small amount. The surplus developing solution remains in a bendback edge portion of the mask sheet. A trap member is enveloped in the bendback edge portion, and traps or captures the surplus developing solution.

There are various examples of photo film units different in size, including Photorama Film (trade name) manufactured by Fuji Photo Film Co., Ltd. with a size of 97×102 mm, Joycam Film (trade name) manufactured by Polaroid Corporation with a size of 64×111 mm, and Xiao Film (trade name) manufactured by Polaroid Corporation with a size of 30×160 mm.

Recently there has been an idea of reducing the overall size of the photo film unit in consideration of reduction of the size of an instant camera. At the same time, a frame size of the photo film unit should be kept sufficiently large. Thus it is desired to reduce a width of the bendback edge portion containing the trap member. In the course of taking an instant photograph, the surplus developing solution is absorbed immediately after the developing solution is spread. The developing solution exists in the vicinity of the trap member in a temporary manner with high fluidity. Swelling of the trap member requires comparatively much time. If a user manually grasps the trap member immediately after the development, the surplus developing solution is very likely to flow out of gas vents or air holes.

Although the above-mentioned various sizes exist for the photo film units, there is no known photo film unit easy to be handled for preservation after taking an exposure. To facilitate the handling, the size of the photo film unit should be reduced further. However excessive smallness of a photo film unit causes reduction of the frame size. If a number of people are photographed in a single frame, it is likely that faces of those people cannot be recognized clearly by viewers.

SUMMARY OF THE INVENTION

In view of the foregoing problems, an object of the present invention is to provide a self-developing photo film unit in which a trap member can trap surplus developing solution without enlarging a bendback edge portion wrapping the trap member.

Another object of the present invention is to provide a self-developing photo film unit which is easy to be handled after being exposed and also with a sufficiently large frame size.

In order to achieve the above and other objects and advantages of this invention, a self-developing photo film unit has a photosensitive sheet, first and second spacer rail members, a cover sheet, a mask sheet, a developing solution pod, and a strip-shaped trap member. The mask sheet has a mask portion and first and second bendback edge portions defined by being bent along first and second bend lines. The mask portion has an aperture. The developing solution pod contains developing solution and is squeezed and enclosed between the first bendback edge portion and the mask portion. After the photosensitive sheet is provided with an exposure, the developing solution is spread from the developing solution pod between the photosensitive sheet and the cover sheet while being regulated between the first and second spacer rail members. The trap member is squeezed and enclosed between the second bendback edge portion and the mask portion, and captures surplus part of the developing solution after the developing solution is spread. In the self-developing photo film unit, the trap member comprises non-woven fabric having a porosity of 70% or more, including acid polymer impregnated therein, and having first and second surfaces. The first surface is opposed to the second bendback edge portion, and has the acid polymer impregnated more than the second surface. A securing region is disposed along one of two longer side lines of the trap member nearer to the aperture, coated with adhesive agent, for securing the trap member to the second bendback edge portion.

By the construction with the porosity of 70% or more, the surplus developing solution can be reliably trapped. By the acid polymer impregnated in the non-woven fabric, spaces between fibres in the fabric can be reduced so as to prevent the surplus developing solution from passing out of the trap member. As the acid polymer is impregnated more in the first surface than in the second surface, the second surface can be provided larger spaces between fibres so as to ensure trapping of the surplus developing solution. Also the first surface can be provided with smaller spaces between fibres so as to block passage of surplus developing solution out of the trap member. By the securing region of the trap member secured to the second bendback edge portion, the surplus developing solution is prevented from leaking out of gas vents or air holes of the photo film unit.

In a preferred embodiment, the second surface has a rougher texture than the first surface.

The self-developing photo film unit has a size of an ID-1 type card according to an external size of length varying from approximately 85.6 mm to 125 mm, height of approximately 53.98 mm to 88.0 mm, and thickness of approximately 0.76 mm, and a ratio of an area of the aperture to an area of a margin portion defined outside the aperture is 1.4 or more.

By this construction, the photo film unit is easy to be handled after being exposed and also with a sufficiently large frame size.

The adhesive agent is pressure-sensitive adhesive agent.

According to one aspect of the present invention, the trap member comprises non-woven fabric having porosity of 70% or more, including acid polymer impregnated therein, being produced by a wet process, and including fibres, and the fibres including 3–20 wt. % of pulp.

The fibres further include an ester type of fibres.

By the inclusion of 3–20 wt. % of the pulp, it is possible in the course of the wet process to keep moisture effectively and avoid dewatering and failure in the production of the non-woven fabric.

According to another aspect of the present invention, a hot-melt adhesive layer is overlaid on an inner surface of the second bendback edge portion opposed to the trap member. A single heat sealing region is disposed along one of two longer side lines of the trap member nearer to the aperture, and secured to the second bendback edge portion by application of heat and pressure to the hot-melt adhesive layer through the second bendback edge portion.

By the single heat sealing region of the trap member secured to the second bendback edge portion, the surplus developing solution is prevented from leaking out of gas vents or air holes of the photo film unit.

According to still another aspect of the present invention, the second bendback edge portion includes a first edge, the trap member being disposed between the first edge and the second bend line, the first edge being secured to the cover sheet. The photosensitive sheet and the second bendback edge portion satisfy a condition of:

$$0.5 \text{ mm} \leq D1-D3 \leq 0.8 \text{ mm}$$

where D3 is a distance from the second bend line to the first edge, and D1 is a distance from the photosensitive sheet to the first edge while the second bendback edge portion is substantially straightened from the mask portion.

By the construction of $$D1-D3 \geq 0.5 \text{ mm}$$

an internal space defined around the trap member can be adequately obtained. By the construction of $$D1-D3 \leq 0.8 \text{ mm}$$

the first edge of the second bendback edge portion can be kept from appearing inside the aperture and from being photographed.

The second bendback edge portion is constituted by a first free section, a trap section, a second free section and a securing section arranged in sequence from the second bend line to the first edge. The trap section is mounted on the trap member. The securing section is secured to the cover sheet, and has a gas vent defined by keeping a part of the securing section unattached from the cover sheet. The first free section is in a range of 0.65–1.0 mm. The second free section is in a range of 1.25–1.5 mm.

By the first free section in a range of 0.65–1.0 mm, surplus developing solution is prevented from returning to the aperture. By the second free section in a range of 1.25–1.5 mm, it is possible to ensure a space for guiding gas or air sufficiently to gas vents or air holes.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

EXAMPLE 1

Figure 1:
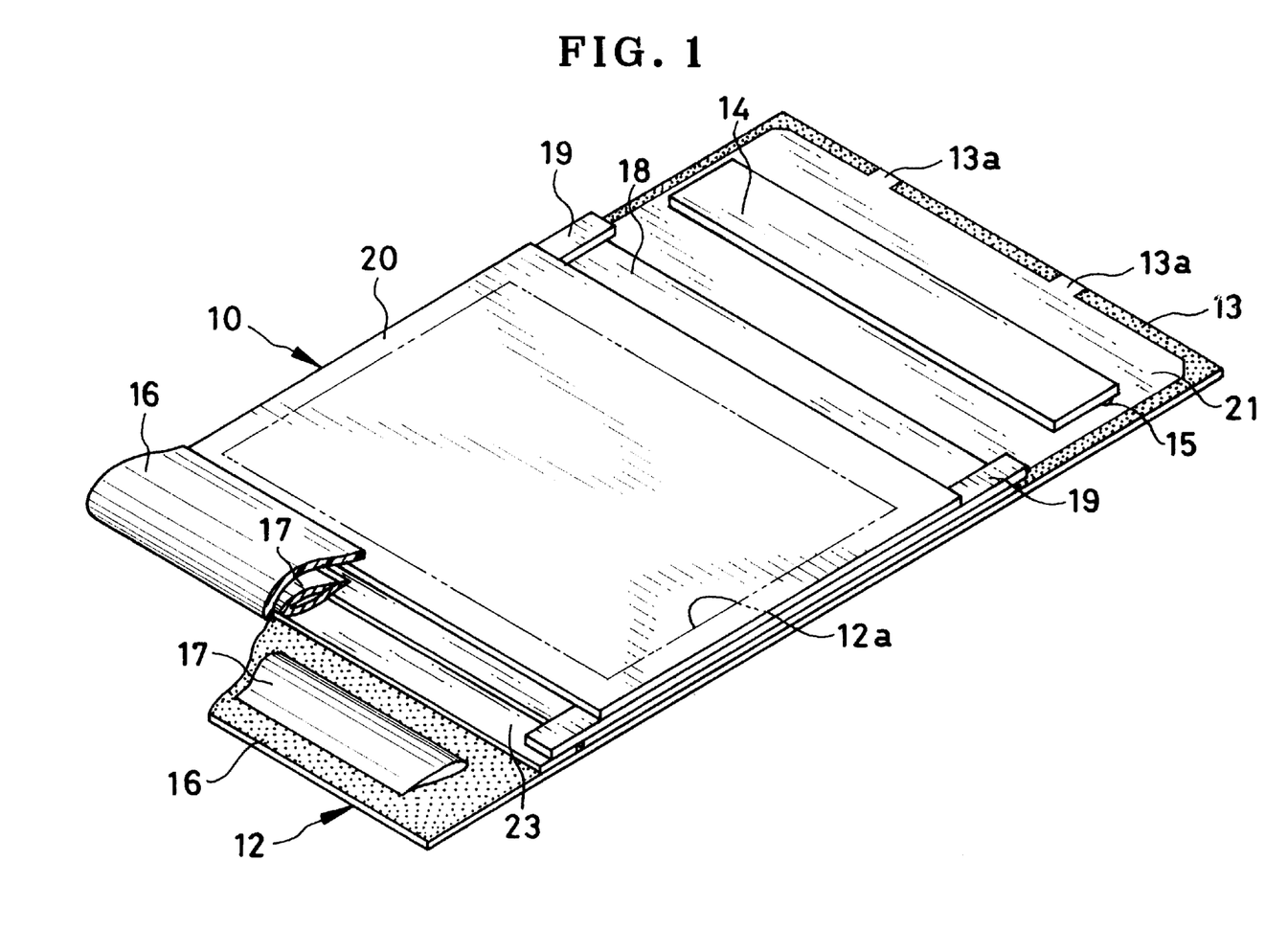
FIG. 1 is a perspective, partially broken, illustrating a spread state of a self-developing photo film unit.

A self-developing photo film unit 10 of Example 1 is illustrated in FIG. 1. A mask sheet 12 is a relatively thin plastic film, and coated with adhesive agent on one entire surface to be attached. An aperture 12a is formed in the center of the mask sheet 12. A pair of unadhered portions 13a are disposed on a bendback edge portion of the mask sheet 12, and defined without adhesion by adhesion of a securing section 13 to a cover sheet 20. The unadhered portions 13a constitute gas vents 12b or air hole. See FIG. 2. A developing solution pod 17 is disposed to overlap both a photosensitive sheet 18 and an underlaid member 23 attached to the mask sheet 12.

The developing solution pod 17 is attached to a first bendback edge portion 16 of the mask sheet 12 by adhesion, and constructed to contain the developing solution. A trap member 14 of a strip shape is attached to a second bendback edge portion 21 of the mask sheet 12 with pressure-sensitive adhesive agent 15, and constructed to capture surplus part of developing solution.

The photosensitive sheet 18 in a quadrilateral shape is attached to a front face of the mask sheet 12 to cover the aperture 12a. A pair of spacer rail members 19 are attached to a front face of the photosensitive sheet 18 in lateral positions. The cover sheet 20 being transparent is attached over the spacer rail members 19. The spacer rail members 19 are black-color plastic plates having a relatively large thickness, and keep a space between the photosensitive sheet 18 and the cover sheet 20 for regularizing a thickness with which the developing solution is spread. The bendback edge portions of the mask sheet 12 are bent back along edges of the photosensitive sheet 18 and the underlaid member 23 to wrap the trap member 14 and the developing solution pod 17, and attached to the cover sheet 20 with strong adhesion.

Figure 2:
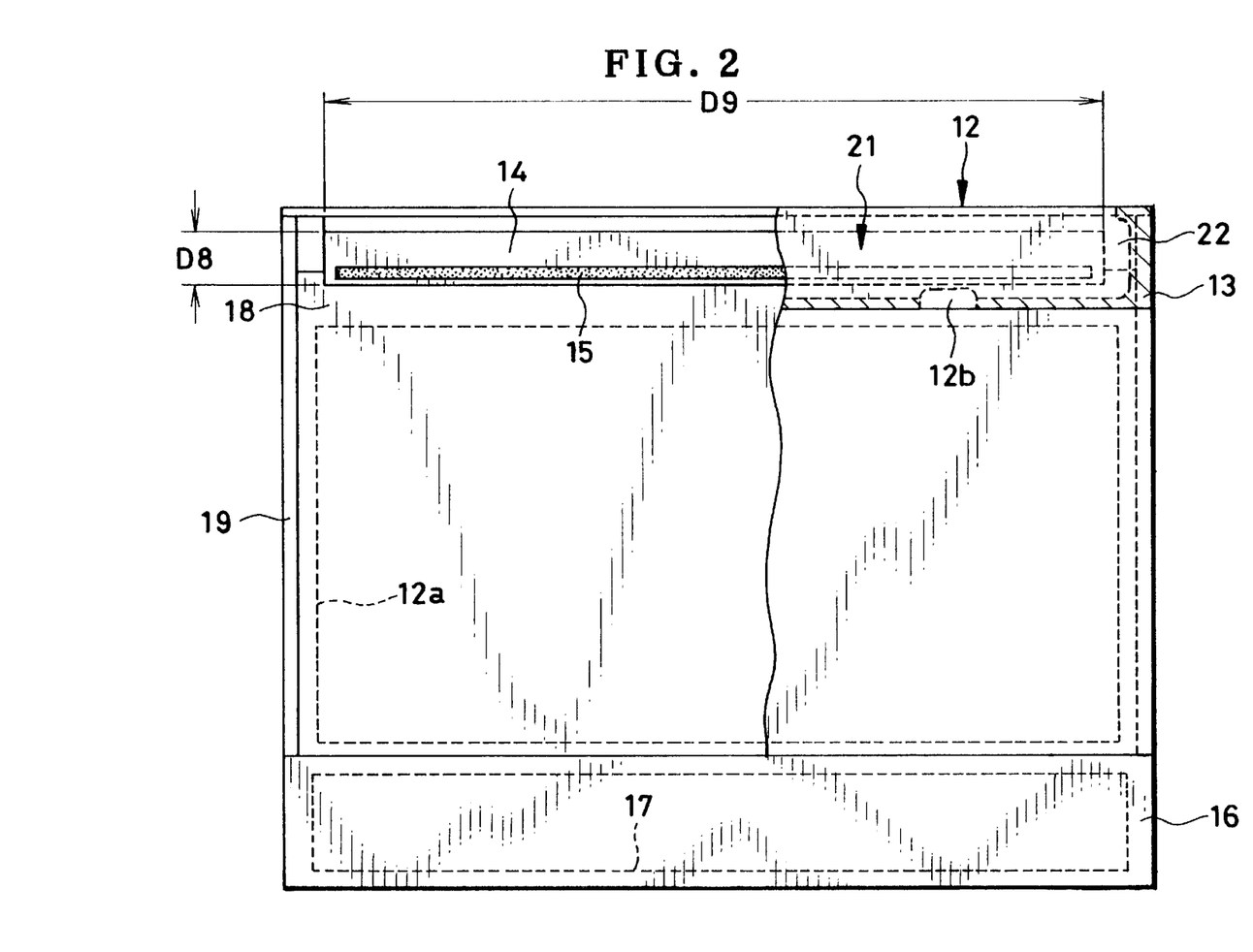
FIG. 2 is a plan illustrating the photo film unit.
Figure 3A:
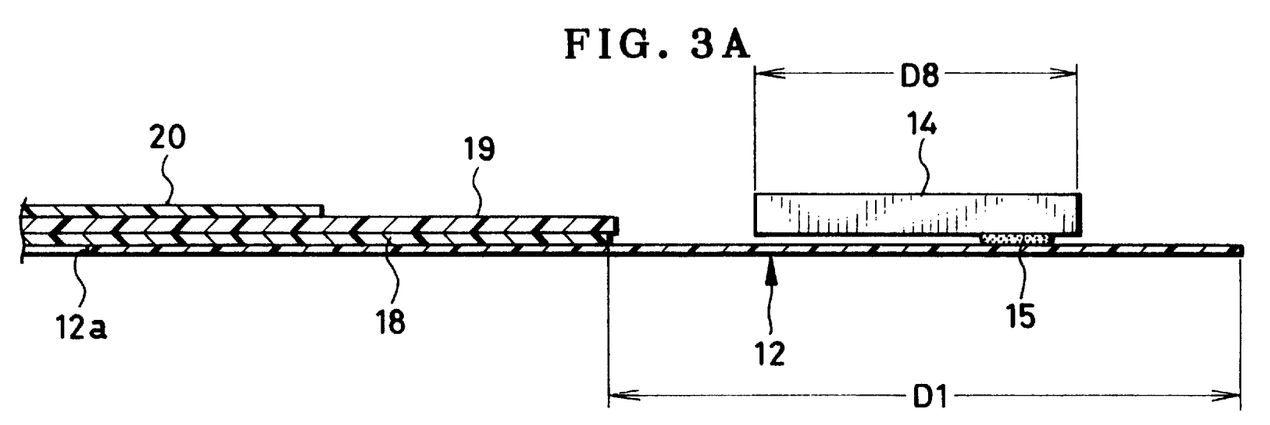
FIG. 3A is a cross section, partially broken, illustrating a straightened state of a bendback edge portion with a trap member.
Figure 3B:
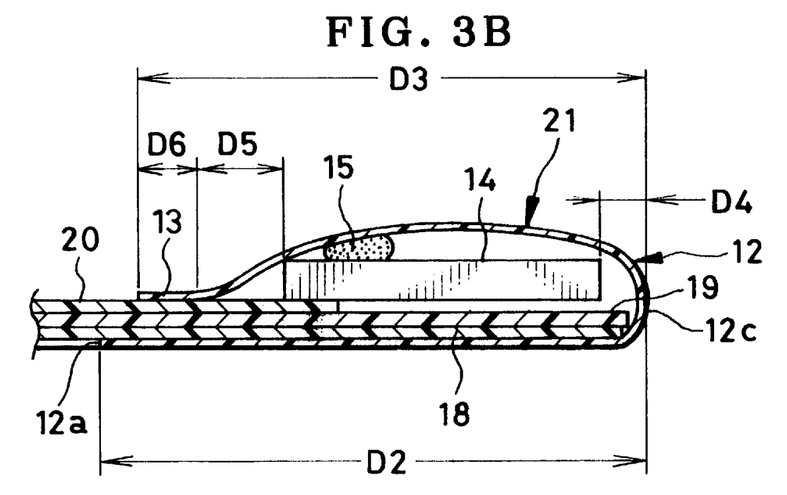
FIG. 3B is a cross section, partially broken, illustrating the bendback edge portion with the trap member in a completed state of the photo film unit as a product.

In FIGS. 2 and 3A, the pressure-sensitive adhesive agent 15 for adhesion between the mask sheet 12 and the trap member 14 is disposed in one region which extends straight along one of the longer sides of the trap member 14 and is located offset from the center of the shorter sides of the trap member 14 away from a second bend line 12c of the mask sheet 12 defining the bendback edge portion for the trap member 14. In FIG. 3B, an edge of the mask sheet 12, after bending back the mask sheet 12, is attached to a surface of the cover sheet 20. A gap between the mask sheet 12 and the trap member 14 is sufficiently large on a side of receiving the flow of a surplus part of the developing solution as indicated by the arrows at D4.

In FIG. 3A, let D1 be a distance between an end of the photosensitive sheet 18 and an end of the mask sheet 12 before bending of the mask sheet 12. In FIG. 3B, let D3 be a distance between the end of the mask sheet 12 and the second bend line 12c of the photo film unit 10. The distance D1 is determined longer than the distance D3 for facilitating bending of the mask sheet 12 with the surplus length. If the difference between D1 and D3 is too great, the mask sheet 12 will be so bent that the distance D3 to the securing section 13 of the mask sheet 12 will become over a distance D2 between the second bend line 12c and an end of the aperture 12a and there occurs a small portion projecting into the aperture 12a. Thus a value of D1–D3 should be within a range between upper and lower limits, preferably is 0.4–0.8 mm, desirably is 0.5–0.8 mm, and in the present embodiment, is determined 0.6 mm.

Let D4 be a distance between the second bend line 12c and an end of the trap member 14 as a range of a first free section. Let D5 be a distance between the trap member 14 and a position where the cover sheet 20 is connected with the end of the mask sheet 12 near to the gas vents 12b depicted in FIG. 1, namely a range of a second free section. The distances D4 and D5 depend upon a size of the trap member 14 and a position of attachment of the trap member 14. The distance D4 is preferably 0.5–1.0 mm, is desirably 0.65–1.0 mm, and is determined 0.90 mm according to the embodiment for the purpose of preventing the solution from spreading laterally and from returning to the inside of the frame. The distance D5 is preferably 0.9–1.5 mm, is desirably 1.25–1.50 mm, and is determined 1.30 mm according to the embodiment for the purpose of sufficiently introducing air inside the photo film unit to the gas vents 12b. Let D6 be an adhered width of a region for heat sealing of the mask sheet 12 to the cover sheet 20. D6 is preferably 0.4–1.0 mm for ensuring strength of heat sealing.

When the photo film unit 10 is exposed, the photo film unit 10 is moved to a position between two spreader rollers (not shown) in a direction of the developing solution pod 17. The spreader rollers squeeze and tear open the developing solution pod 17. The developing solution from the developing solution pod 17 is spread between the photosensitive sheet 18 and the cover sheet 20. Air having been contained in the photo film unit 10 is pushed out by the developing solution, and passed at corners 22 to exit from the gas vents 12b to the outside of the photo film unit 10.

The second bendback edge portion 21 of the mask sheet 12 receives a flow of the surplus part of the developing solution. The surplus part of the developing solution enters a gap between the mask sheet 12 and the trap member 14. The gap is large enough to cause the trap member 14 to capture the surplus developing solution in a great area. The solution does not leak out of the gas vents 12b.

When the developing solution is spread between the photosensitive sheet 18 and the cover sheet 20, development starts. At a lapse of predetermined time for the development, a photographed image appears on the photosensitive sheet 18 in a position of the aperture 12a.

Note that it is possible to use the structure of the present invention in a self-developing photo film unit of a type known as Joycam (trade name) manufactured by Polaroid Corporation, which type includes a photosensitive sheet and mask sheet bent back to cover a trap member and attached to a back surface of the photosensitive sheet.

EXAMPLE 2

Figure 4A:
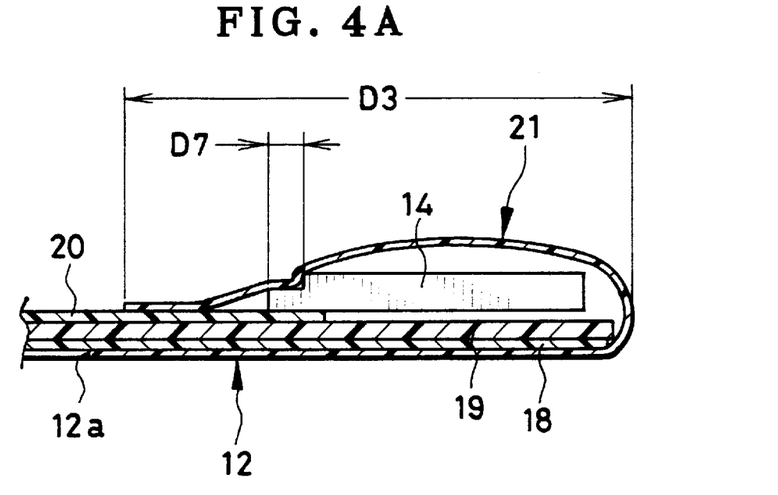
FIG. 4A is a cross section, partially broken, illustrating another preferred embodiment in which the trap member is attached by heat sealing to the bendback edge portion.

A self-developing photo film unit of Example 2 is illustrated in FIG. 4A. Heat sealing is used at a width D7=1 mm without using the pressure-sensitive adhesive agent 15. Other elements are the same as those of Example 1. For the heat sealing, a sealing blade is used, and has a width of 1 mm and a length of 100 mm. A distance difference D1–D3 is equal to that of Example 1. It is to be noted that, in Examples 1 and 2, the trap member 14 has the width D8=2.3 mm, and the length D9=100 mm. See FIG. 2.

Figure 4B:
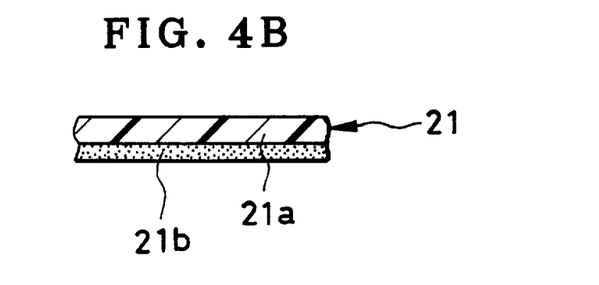
FIG. 4B is a section illustrating structure of the bendback edge portion with layers.

To be precise, the mask sheet 12, or at least the second bendback edge portion 21 is a combination as depicted in FIG. 4B, including a plastic film 21a and a hot-melt adhesive layer 21b overlaid thereon. The hot-melt adhesive layer 21b is melted by application of heat and pressure with the sealing blade, to attach the trap member 14 to the second bendback edge portion 21.

It is to be noted that it is possible to omit the hot-melt adhesive layer 21b. Thermal welding may be used to attach the trap member 14 to the second bendback edge portion 21, as the sealing blade can heat and pressurize the second bendback edge portion 21 toward the trap member 14 for the purpose of direct attachment.

COMPARATIVE EXAMPLE

Figure 5:
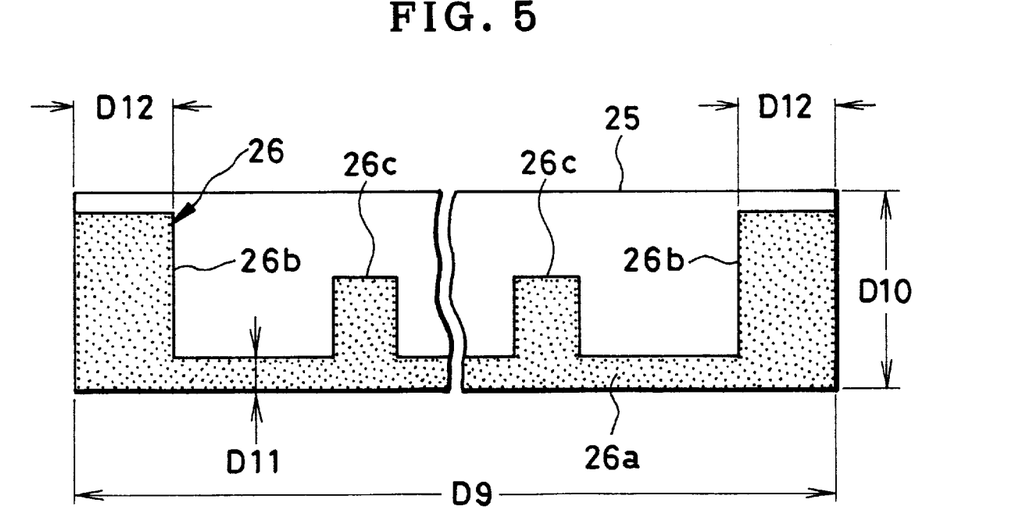
FIG. 5 is an explanatory view in plan, illustrating a trap member according to Comparative Example.

A self-developing photo film unit of Comparative Example is illustrated in FIG. 5. A trap member 25 is provided with a heat sealing region 26 patterned as depicted, and attached to the mask sheet 12 by heat sealing. The length D9 of the trap member 25 is 100 mm which is equal to that in the trap member 14 according to Examples 1 and 2. But the trap member 25 has a width D10=4.4 mm, which is greater than the width D8 of the trap member 14. The heat sealing region 26 is constituted by a line-shaped part 26a, two large-column parts 26b and two small-column parts 26c. The line-shaped part 26a has a width D11=1 mm and extends along a longer side line of the trap member 25. The large-column parts 26b are disposed on shorter side lines of the trap member 25, extend from the line-shaped part 26a, and have a width D12=5 mm. The small-column parts 26c are disposed between the large-column parts 26b and extend from the line-shaped part 26a.

Performance of Examples 1 and 2 and Comparative Example was experimentally checked. A critical surplus amount of the developing solution in relation to the leakage of the surplus developing solution was checked, and determined respectively as 310 microliters ($\mu l$), 290 microliters and 250 microliters. In Examples 1 and 2, the leakage critical amount of the surplus developing solution was observed to be more than that in Comparative Example. Note that it is desirable that D4≧0.5 mm, and D5≧0.9 mm.

A method of producing the non-woven fabric to be used in the present invention is a wet process. The wet process as a non-woven fabric producing method is a method in which a paper machine is used in a manner similar to production of paper. Prepared raw materials in combination are: 19 parts by weight of 110° C.-melting fibres of ester type (1.5 deniers×5 mm fibres); 13 parts by weight of 130° C.-melting fibres of ester type (2.0 deniers×5 mm fibres); 10 parts by weight of pulp of a cellulose type; and 58 parts by weight of T-shaped-section profile fibres of ester type (2.0 deniers×5 mm fibres). Those materials are dispersed in water to produce non-woven fabric.

The fabric in a sheet shape has two surfaces which are referred to as a felt side and a wire side. The felt side may be also called a blanket side. It is general that one of the two surfaces has a rougher texture than the other, namely that the interval between the fibres on one of the surfaces is longer than that on the other. Which of the felt side and the wire side is rougher depends upon various conditions including features of the paper machine and the paper producing method. In the present embodiment, the wire side is contacted by a drier as a glossy surface so that the felt side is rougher. Drying operation with the drier melts and bonds up the 110° C.-melting fibres, to provide appropriate strength in the produced non-woven fabric.

Examples of methods of heat bonding between fibres are the calendar roll method and the oven method, the latter of which is preferably used in the embodiment of the invention. In the oven method for the heat bonding, thermal melting fibres are heated at a temperature equal to or higher than their melting point without pressurization. A heater for this purpose is disposed to an upper surface of an oven. Heat from the heater is applied to the felt side with the rougher texture, so as to cause the fibres to shrink in the condition without pressurization. The roughness of the rougher texture is increased. This is effective in operation of the solution absorbing member for absorbing the surplus developing solution.

If only synthetic fibres are used in producing non-woven fabric according to the wet process, failure in the production occurs, because dewatering between the synthetic fibres is excessively quick in the course of production. Thus 10 wt. % of the pulp is added to keep moisture effectively. The pulp can be added in a range of preferably 3–20%, and desirably 7–15%. The use of the fibres with the melting point of 110° C. is for melting with the drier in the paper production at the drying temperature of at most 110° C. The use of the fibres with the melting point of 130° C. is for thermal treatment and post-treatment steps including impregnation and drying.

A preferable ratio of weight of the 110° C.-melting fibres to the 130° C.-melting fibres mixed therewith is 19:13. A preferable weight of the 110° C.-melting fibres is approximately 20% as a level enough for being bonded with sufficient strength by use of the drier used in the paper production. A preferable sum of amounts of the 110° C.-melting and 130° C.-melting fibres should satisfy such conditions that the non-woven fabric will not shrink upon the impregnation, that swelling will not occur due to gelation of the acid polymer, and that the fibres can be bonded acceptably by melting without collapsing the gaps between the fibres. On the other hand, the trap member 14 should satisfy such conditions that the trap member 14 should not be collapsed even with pressure of 3 kg from spreader rollers having a diameter of 6.5 mm, that the sizes D8 and D9 should be sufficiently great, and that the thickness of the trap component with the second bendback edge portion 21 should be 0.9 mm or less. For those conditions, the porosity of the non-woven fabric, namely a proportion of a space within the non-woven fabric to its total volume, should be 70% or more. It is to be noted that an upper limit of the porosity of the non-woven fabric characteristically depends upon the wet process according to which the non-woven fabric is produced in the present invention.

Calculation of the porosity is described now. Elements in connection with the porosity are as follows:

Weight of the non-woven fabric per unit area: $M$ (g/m$^2$)

Included amount of the acid polymer: $S$ (g/m$^2$)

Specific gravity of the ester-type fibres for the non-woven fabric: 1.38

Specific gravity of the cellulose-type fibres for the non-woven fabric: 1.50

Specific gravity of the polymer of acid: 1.20

Thickness of the trap member: $t$ (cm)

Then the porosity PR is expressed by the following formula.

$$PR = 100 - 100\,[(0.9M/1.38 + 0.1M/1.50 + S/1.2)/10000t]$$

For example, the above-mentioned Examples 1 and 2 and Examples 3–6, which will be described later, satisfy $M=130$ g/m$^2$, $S=100$ g/m$^2$, and $t=0.065$ cm. By substitution of those values in the above formula, the porosity is obtained as $PR=72.8\%$.

In Examples 1 and 2, the above-described non-woven fabric and solution were prepared. The solution was produced as follows. Polyacrylic acid was mixed with 7.5 mol % of epoxy hardening agent relative to the polyacrylic acid, and was mixed with 3.75 mol % of NaOH relative to the polyacrylic acid. An example of the polyacrylic acid was AQUALIC HL-415 (trade name) manufactured by Nippon Shokubai Kagaku Kogyo Co., Ltd., and included 36% of solid component. An example of the epoxy hardening agent was DENACOL EX-810 (trade name) manufactured by Nagase Kasei Kogyo. Then the mixture was diluted with methanol and water to obtain the solution in which the polyacrylic acid was included at the density of 25%. The solution was impregnated in the non-woven fabric to provide the non-woven fabric with the solid component of approximately 100 g/m$^2$. Then the non-woven fabric was dried at 110° C. for 10 minutes, and was used as trap member. It is to be noted that other commercially available polyacrylic acid may be used, for example JURYMER AC10L (trade name) manufactured by Nippon Junyaku K. K. Also, examples of the epoxy hardening agent should be selected in consideration of its reaction with the acrylic acid. An amount of the epoxy hardening agent should be determined in consideration of absorbability of the developing solution. For example, ARALDITE DY 0-22 (trade name) manufactured by Chiba-Geigy may be used as epoxy hardening agent, and should be added at an amount of 5 mol % relative to the polyacrylic acid.

In Comparative Example, the above-described non-woven fabric and solution were prepared. The solution was produced as follows. Polyacrylic acid was diluted with methanol, to obtain the solution in which the polyacrylic acid was included at the density of 15%. The solution was impregnated in the non-woven fabric, which was dried at 110° C. for 10 minutes, and was used as a trap member. Note that the trap member was the same as that which was according to Examples 1 and 2 described above, but from which the epoxy hardening agent and NaOH were eliminated.

Figure 6:
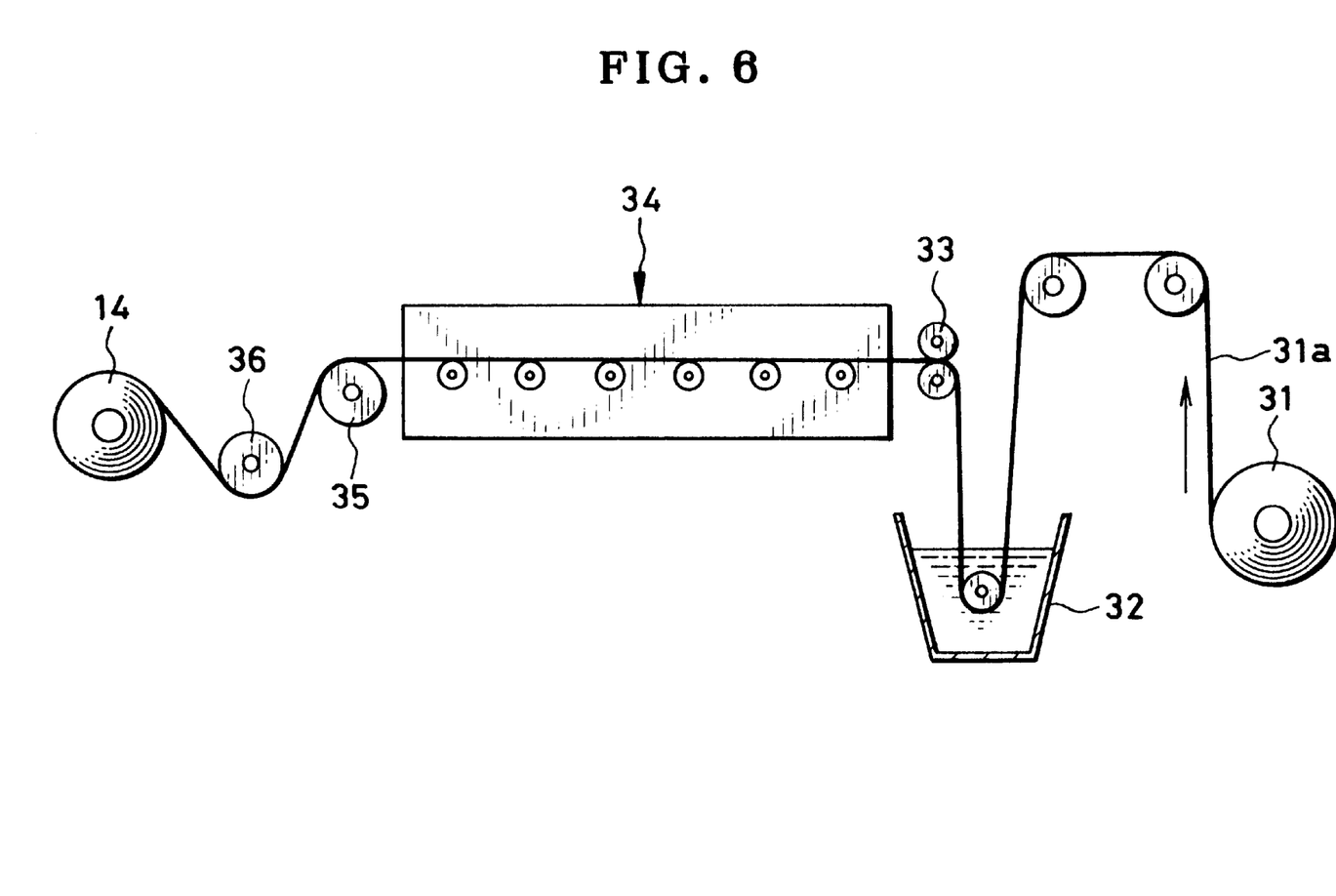
FIG. 6 is an explanatory view in elevation, illustrating a process of impregnation of acid polymer in non-woven fabric.

In FIG. 6, a process of impregnation of the non-woven fabric in manufacturing the trap member is depicted. A fabric roll 31 is a roll of continuous non-woven fabric 31a. At first, the continuous non-woven fabric 31a is unwound from the fabric roll 31, and is sunken in an impregnating bath 32 filled with impregnation solution. In unwinding the continuous non-woven fabric 31a, its felt side is kept directed up. Its wire side is kept directed down to contact a drier. Nip rolls 33 squeeze the continuous non-woven fabric 31a to eliminate a surplus part of the impregnation solution. The continuous non-woven fabric 31a with the impregnation solution is sent to a drier device 34.

The continuous non-woven fabric 31a including the impregnation solution is conveyed in parallel with the ground surface inside the drier device 34. In the course of the passage of the continuous non-woven fabric 31a in the drier device 34, the acid polymer is naturally caused by gravity to come downwards inside the continuous non-woven fabric 31a before drying of the impregnation solution. The continuous non-woven fabric 31a is so oriented that one of its surfaces with the rougher texture than the other is directed upwards. In the present embodiment, the felt side is directed up, and has the texture in which an average interval between the fibres is relatively long. Thus the acid polymer can be impregnated in the continuous non-woven fabric 31a with the rough texture of its upper surface kept rough, as no excessive acid polymer is filled between the fibres. After the continuous non-woven fabric 31a is dried at 110° C. in the drier device 34, the continuous non-woven fabric 31a is heated at 110° C. and dried by a heating drum 35. Then the continuous non-woven fabric 31a is cooled by a cooling drum 36 down to 25° C., and also wound thereabout, so as to obtain the trap member 14 finally.

Formulation of the above impregnation solution is indicated in the following table.

| Components | Parts By Weight |
|---|---|
| Polyacrilic Acid | 49.2 |
| 5N-Sodium Hydroxide | 2.7 |
| Epoxy Hardening Agent | 2.6 |
| Ion Exchange Water | 3.2 |
| Methanol Or Ethanol | 42.3 |

In order to suppress easy passing of the surplus developing solution through the trap member in the course of spreading of the developing solution, it is necessary to increase density of the fibres to reduce an average diameter of holes or gaps between fibres on the surfaces or near to the surfaces. If the average hole diameter is excessively great, the performance of absorbing the solution is too low in the spreading. The surplus developing solution extends on the periphery of the trap member to result in leaking out of a gas vent or air hole.

If an average hole diameter is too small, the surplus developing solution passes through the non-woven fabric, and leaks out of a gas vent or air hole. Acid-type carboxyl groups of a sufficient amount cannot be maintained in view of requirement for neutralizing the developing solution as alkali, of which an absorbed part may remain without being neutralized. Furthermore the adhered portions may be peeled, the solution may be leaked, or portions inside a frame may be color-faded. In consideration of those conditions, the trap member as non-woven fabric can have such first and second side portions that the first side portion has a relatively greater average hole diameter and is disposed in a direction of receiving the flow of the surplus developing solution, and that the second side portion has a relatively smaller average hole diameter and is disposed in a direction reverse to the flow of the surplus developing solution. It is possible that the changes in the average hole diameter may be continuous or stepwise with reference to a thickness direction of the trap member.

To provide the non-woven fabric with stepwise changes in its thickness direction, it is possible to prepare a plurality of non-woven fabrics different in the thickness of fibres, and to bond them in such an orientation that the non-woven fabric with finer fibres is located on an upper side. Otherwise, it is possible to use a multi-layer type of the non-woven fabric, in which plural layers are different in the thickness of the fibres. To produce the multi-layer non-woven fabric, at first fibres of a first type with a greater thickness are disseminated. Then fibres of a second type with a smaller thickness are disseminated over the first type. Those fibres of the first and second types are heated and pressurized by a heat roller to obtain the non-woven fabric. The fibres of the first type preferably has a thickness of 8–15 deniers. The fibres of the second type preferably has a thickness of 2–6 deniers.

This structure has effects similar to those of a structure in which the non-woven fabric is provided with changes in the density. As the average hole diameter is relatively great in the flow-receiving side, the surplus developing solution is quickly captured. As an upper face of the trap member has the relatively small average hole diameter, the surplus developing solution being absorbed can be reserved reliably. The non-woven fabric, as described above, is kept oriented to direct its rougher surface with the greater average hole diameter in the course of impregnation of the acid polymer. Thus the less rough surface with the smaller average hole diameter has a relatively higher ratio of the acid polymer being included. This surface of the non-woven fabric, in which the acid polymer of a higher amount is impregnated, is attached to a surface of the bendback edge portion of the mask sheet being bent back. It is to be noted that, if fibres of the same kind are used, the average hole diameter decreases according to an increase of the fibre density. Of course the average hole diameter changes according to the thickness of the fibres while the fibre density is equal.

In a preferred embodiment with reference to FIGS. 7–10, self-developing photo film units 41 have a preferable size D100×D101 which is substantially equal to a size of the ID-1 type card being 85.6 mm long and 54 mm wide. Furthermore a ratio of an area of a frame region of the photo film units 41 to an area of their margin region is equal to or more than 1.4. Thus the photo film unit 41 can have such a sufficient size that, if a number of people are photographed in a single frame, each of their faces can be easily recognized on the obtained photographic print, and also can be handled easily and with much portability.

Figure 9:
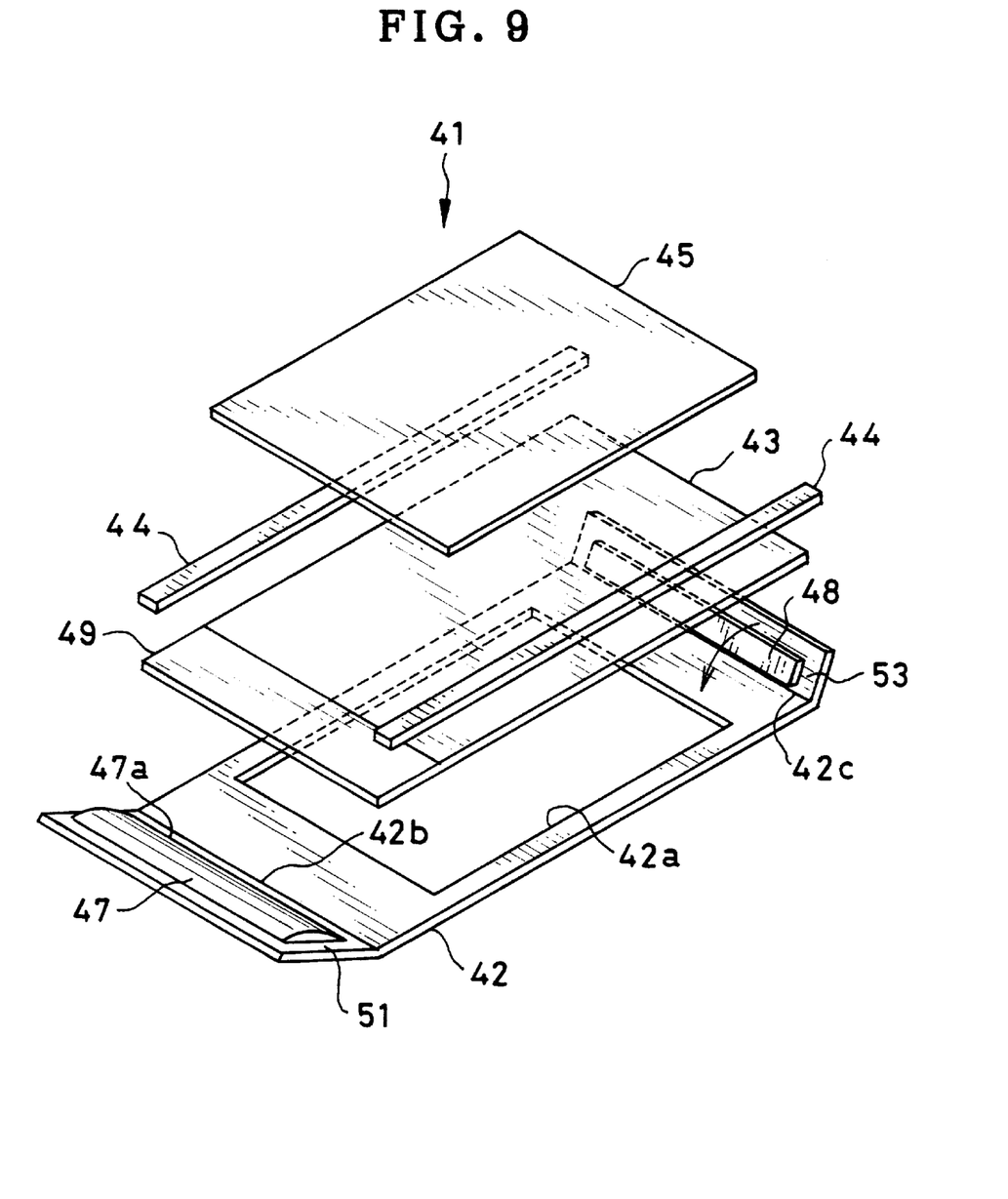
FIG. 9 is an exploded perspective illustrating the photo film unit.

In FIG. 9, the photo film unit 41 has a structure including a mask sheet 42, a photosensitive sheet 43, a pair of spacer rail members 44 and a cover sheet 45 connected sequentially with one another. An aperture 42a is formed in the center of the mask sheet 42. A developing solution pod 47 and a trap member 48 are attached to outer portions which are on the periphery of the mask sheet 42 and defined by first and second bend lines 42b and 42c. After the photosensitive sheet 43, the spacer rail members 44 and the cover sheet 45 are attached to the mask sheet 42, the bendback edge portions of the mask sheet 42 are bent along the bend lines 42b and 42c and are attached to the cover sheet 45. The trap member 48 is attached to the mask sheet 42 with adhesive agent in a manner similar to the above. An underlaid member 49 or pad is connected with the photosensitive sheet 43 on the side of the developing solution pod 47, and operates to adjust the height of the developing solution pod 47 and the photosensitive sheet 43 by receiving the developing solution pod 47.

The mask sheet 42 operates to define the periphery of each frame, and has a thickness of 50 $\mu$m. The mask sheet 42 includes a support, which consists of lamination of first and second films, the first being a transparent polyethylene terephthalate (PET) film with a thickness of 12 $\mu$m, and the second being a polyethylene terephthalate (PET) film having a deposit of aluminum and with a thickness of 12 $\mu$m. A first surface of the support is coated with an adhesive layer of an EVA-SBS type at a thickness of approximately 12 $\mu$m. The second surface of the support is coated with a white-color layer and then coated with a logo-printing layer. The white-color layer includes titanium oxide and silica, and has a thickness of approximately 8 $\mu$m. The logo-printing layer is gray. A grain diameter of the silica is approximately 10 $\mu$m. The silica is disposed to emerge in the surface of the white-color layer, so as to ensure suitability for writing with a pencil or ball point pen. An amount of the titanium oxide can be adjusted to ensure suitability for writing with a water-based ink of a pen.

The spacer rail members 44 are produced from material for controlling the thickness with which the developing solution is spread, and for attaching the cover sheet 45 to the photosensitive sheet 43, and have an average thickness of 64 $\mu$m. Transparent sheets of polyethylene terephthalate (PET) with a thickness of 38 $\mu$m are used. A first surface of the transparent sheets is coated with a light-shielding layer at a thickness of 2 $\mu$m, and then coated with an adhesive layer of an EVA-SBS type at a thickness of 8 $\mu$m. The second surface of the transparent sheets are coated with an adhesive layer of an EVA-SBS type at a thickness of 8 $\mu$m. It is to be noted that the thickness or formulation of the adhesive layers may be changed as required, in order to ensure the adhesion on the side of the photosensitive sheet. As the sum of the thicknesses of the two adhesive layers should be unchanged, one of the adhesive layers must have a decreased thickness if the other of the adhesive layers has an increased thickness.

The photosensitive sheet 43 includes a polyethylene terephthalate (PET) support which is 90 $\mu$m thick and includes titanium oxide of a small amount. A first surface of the support is coated with a back layer of an acetyl cellulose type. The second surface of the support is coated sequentially with an image receiving layer, a white-color reflection layer, a light-shielding layer, a red-sensitive emulsion layer, a green-sensitive emulsion layer, a blue-sensitive emulsion layer, an ultraviolet ray absorbing layer, and then a protective layer. A color mixture preventing layer is disposed respectively between those sensitive emulsion layers. A thickness of the entirety of the photosensitive sheet 43 is approximately 115 $\mu$m.

The cover sheet 45 includes a polyethylene terephthalate (PET) support which is 70 $\mu$m thick and includes plural dyes of a small amount for preventing light-piping in the support. A first surface of the support is coated with a filter dye layer of an acetyl cellulose type. The second surface of the support is coated with a neutralizing layer, a neutralizing timing layer, and then a temperature compensating layer. The whole thickness of the cover sheet 45 is approximately 80 $\mu$m.

Figure 10:
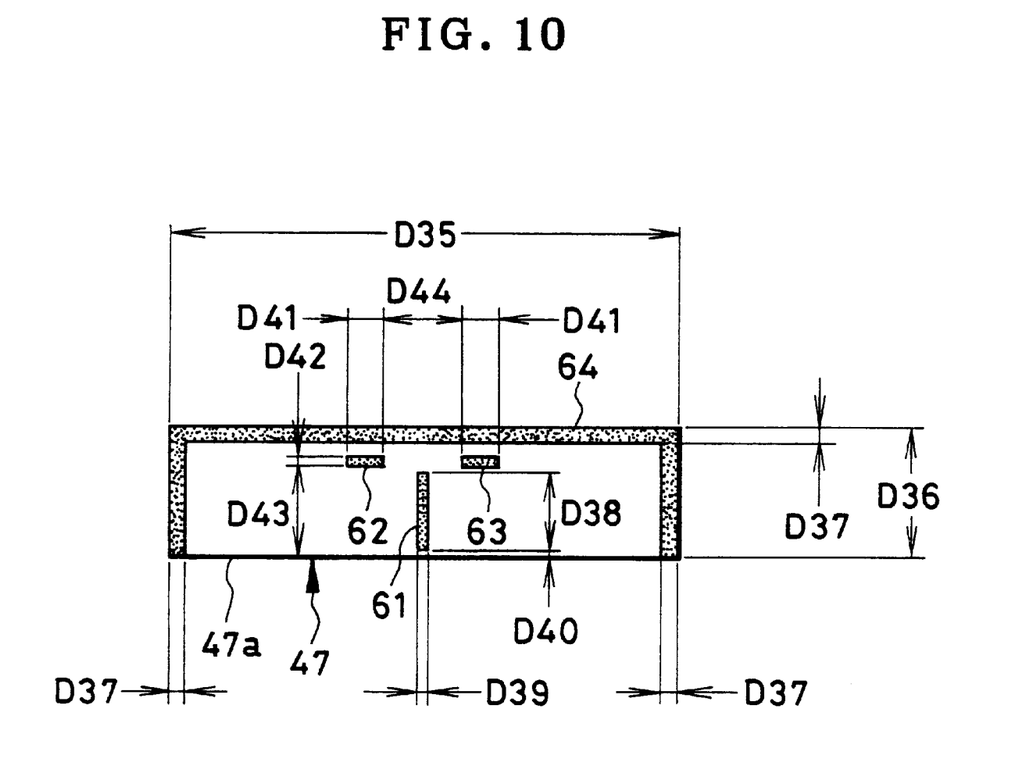
FIG. 10 is an explanatory view in plan, illustrating a developing solution pod.

The developing solution pod 47 includes developing solution of 280 microliters ($\mu$l) and a container member for containing the developing solution. The container member consists of a paper support and an aluminum foil attached thereto by adhesion, and coated with adhesive agent of a vinyl chloride type. In FIG. 10, the developing solution pod 47 is provided with middle sealed portions 61, 62 and 63. Edges of the container member from which the developing solution exits are sealed with a weak sealed portion 64, which is indicated by the hatching in the drawing. The middle sealed portion 61 extends perpendicularly to a pod edge 47*a* of the developing solution pod 47. The middle sealed portions 62 and 63 extend in parallel with the pod edge 47*a*. The middle sealed portions 61–63 are disposed for regularizing the spreading of the developing solution when the developing solution pod 47 flows out upon breakage of the weak sealed portion 64. The underlaid member 49 is a transparent polyethylene terephthalate (PET) film having a thickness of 100 $\mu$m.

It is to be noted that a spreading control member can be disposed in an instant camera between a pack chamber and spreader rollers for controlling spreading of the developing solution from the developing solution pod 47 to the exposure surface by frictionally contacting the photo film unit 41 being moved by the spreader rollers.

Figure 7:
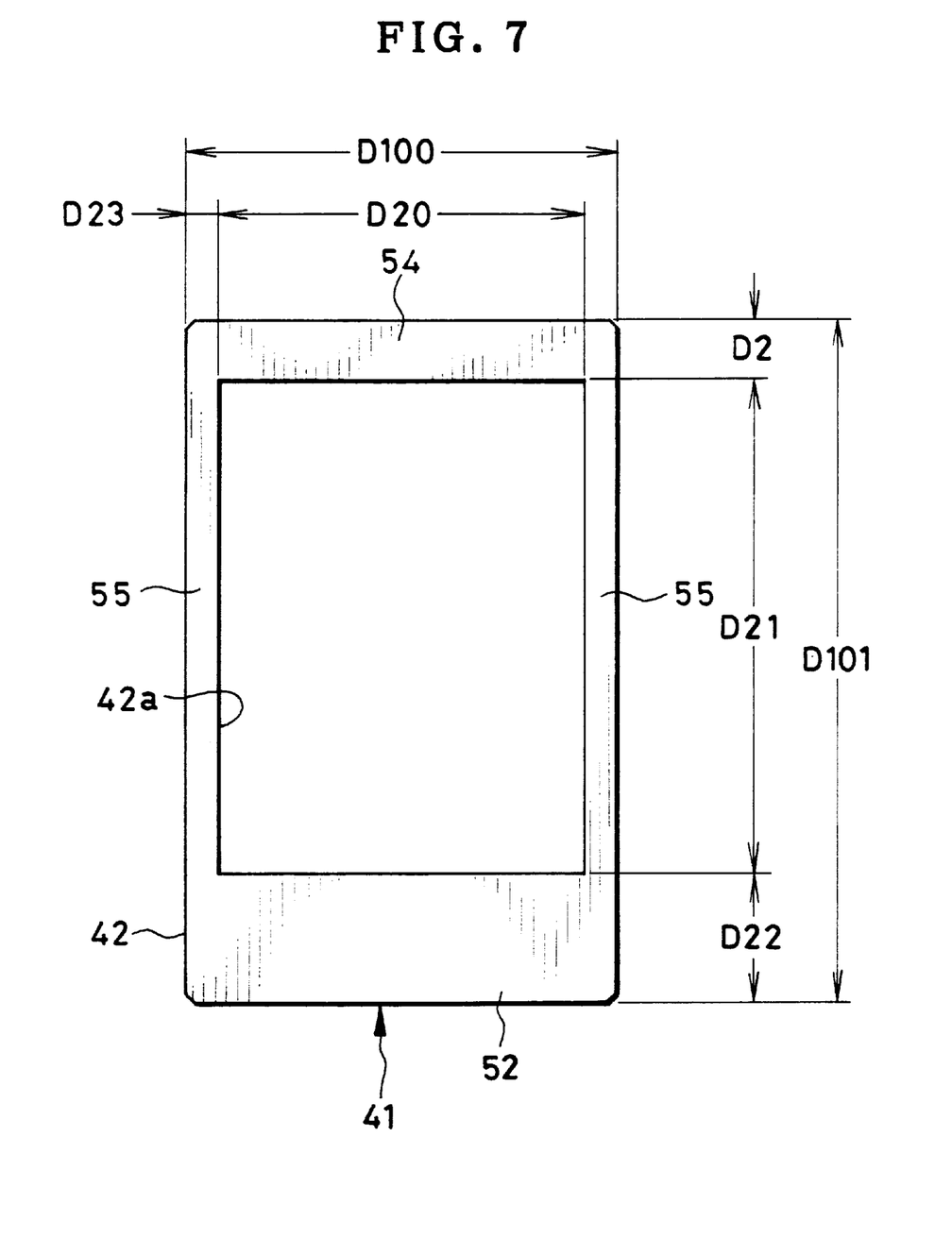
FIG. 7 is a bottom plan illustrating another preferred photo film unit having a size of an ID-1 type card.

In FIG. 7, the photo film unit 41 on the side of the exposure surface is illustrated. The aperture 42*a* in which an image appears has a size of D20×D21. A first bendback edge portion 51 (See FIG. 8) containing the developing solution pod 47 is reverse to a blank space section 52 of a mask portion of the mask sheet 42 which is used by users for filling in words or the like. A second bendback edge portion 53 or T-section (See FIG. 8) containing the trap member 48 in a size D8×D33 is reverse to a T-space section 54 of the mask portion of the mask sheet 42. The spacer rail members 44 are positioned in reverse to lateral sections 55 of the mask portion of the mask sheet 42. The blank space section 52 has a width of D22. The T-space section 54 has a width of D2. The lateral sections 55 have a width of D23. To be precise, D20=46 mm, D21=62 mm, D22=16 mm, D8=2.3 mm, D33=45 mm, D2=7.6 mm, and D23=4 mm. It is possible that letters or signs can be written on the T-space section 54 or the lateral sections 55 with a pencil, a ball point pen or water-based ink.

Figure 8:
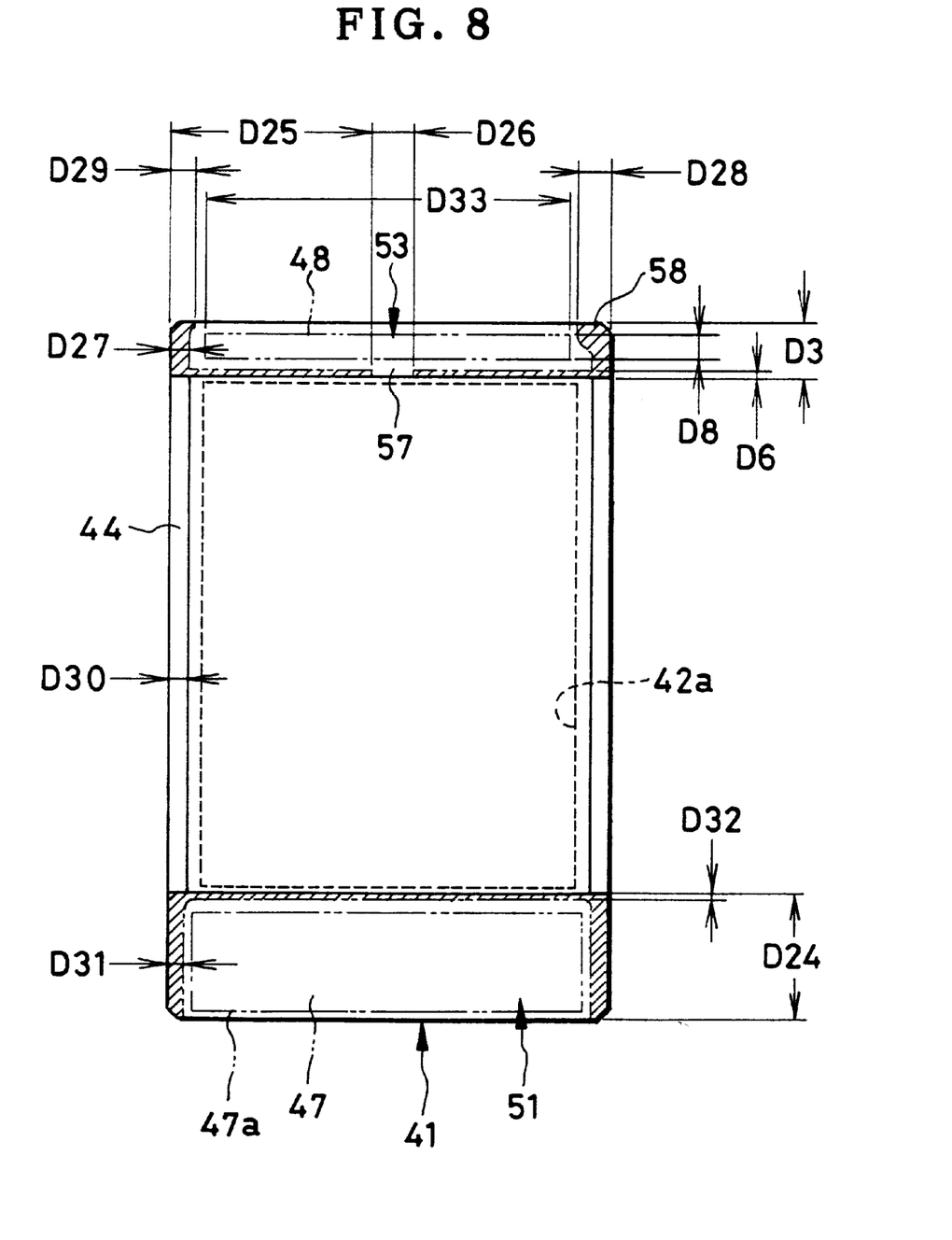
FIG. 8 is a top plan illustrating the photo film unit.

In FIG. 8, the back surface of the photo film unit 41 is illustrated. A gas vent 57 or air hole is defined by keeping a central portion of the second bendback edge portion 53 without being adhered. The gas vent 57 is in a position D25 away from a lateral side of the photo film unit 41, and D25=24.5 mm. The gas vent 57 has a width D26=5 mm. Let D6 be an adhered width of the second bendback edge portion 53 on the photosensitive sheet side. Let D27 be an adhered width of the second bendback edge portion 53 on each lateral side. D6=0.8 mm, and D27=2.2 mm. Let D29 be an adhered width at the corner of a first one of the lateral sides of the second bendback edge portion 53. Let D28 be an adhered width at a corner 58 of the second one of the lateral sides of the second bendback edge portion 53. D29=3 mm, but D28=4.0 mm, because the corner 58 is engageable with the claw mechanism of the instant camera. Also the adhesion of the second bendback edge portion 53 is also effective in preventing leaking of the developing solution at the corners of the photo film unit 41. The spacer rail members 44 have a width D30=2.2 mm. Let D24 be a bend width of the first bendback edge portion 51. Let D31 be an adhered width of the first bendback edge portion 51 one each lateral side. Let D32 be an adhered width of the first bendback edge portion 51 on the side of the photosensitive sheet 43. D24=15.4 mm, D31=1.8 mm, and D32=0.8 mm.

In FIG. 10, let D35 be a length of the developing solution pod 47. Let D36 be a width of the developing solution pod 47. Let D37 be a width of the weak sealed portion 64. Let D38 be a length of the middle sealed portion 61. Let D39 be a width of the middle sealed portion 61. Let D40 be an interval between the middle sealed portion 61 and the pod edge 47*a* of the developing solution pod 47. Let D41 be a length of the middle sealed portions 62 and 63. Let D42 be a width of the middle sealed portions 62 and 63. Let D43 be an interval between the pod edge 47*a* of the developing solution pod 47 and the middle sealed portions 62 and 63. Let D44 be an interval between the middle sealed portions 62 and 63. Those sizes are determined as D35=48.6 mm, D36=12.5 mm, D37=1.5 mm, D38=7.5 mm, D39=1 mm, D40=0.55 mm, D41=3.5 mm, D42=1 mm, D43=8.55 mm, and D44=7.6 mm.

Examples 3–6 as produced experimentally are indicated in the table below. The trap component with the second bendback edge portion 53, namely a thickest portion of the photo film unit 41 after the spreading, had a thickness of 0.9 mm.

|  | Examples | | | |
| --- | --- | --- | --- | --- |
| Sizes | 3 | 4 | 5 | 6 |
| Frame-to-margin area ratio | 1.61 | 1.80 | 1.50 | 1.42 |
| Frame area (cm$^2$) | 28.5 | 29.7 | 27.8 | 27.1 |
| Margin area (cm$^2$) | 17.7 | 16.5 | 18.4 | 19.1 |
| Frame size D20 × D21 (mm) | 46 × 62 | 47 × 63.1 | 46 × 60.4 | 46 × 59 |
| Width D2 of T-space section 54 (mm) | 7.6 | 6.5 | 8.2 | 9.6 |
| Width D22 of blank space section 52 (mm) | 16.0 | 16.0 | 17.0 | 17.0 |
| Width D23 of lateral sections 55 (mm) | 4.0 | 3.5 | 4.0 | 4.0 |

In Example 3, a sufficient trapping space was ensured in correspondence with changes in the amount of surplus developing solution to the second bendback edge portion 53 due to differences in the thickness of the component members, changes in the rotational speed of spreader rollers of the camera, irregularity in their rotation, and differences in the temperature at the spreading time.

In Example 4, the amount of surplus developing solution to the second bendback edge portion 53 was considered at the time of optimally administrating the above-mentioned changes and differences. The second bendback edge portion 53 had a minimized size, to maximize a frame-to-margin area ratio. A spread thickness of the developing solution was 61 μm. If the spread thickness is reduced, the developing solution pod 47 can have the smaller size. When irregularity in spreading is smaller, the second bendback edge portion 53 can have the smaller size. Thus the frame-to-margin area ratio can be enlarged to a further extent.

In Example 5, a length D21 of the longer side of the frame was smaller by 1.6 mm than that in Example 3. The frame-to-margin area ratio was 1.50. The area of the frame was 27.8 cm$^2$. Thus a number of people were able to be photographed in such a manner that each of them was recognized visually with ease. In Example 6, the frame-to-margin area ratio was 1.42, and was the smallest among those of Examples 1–4. A length D21 of the longer side of the frame was smaller by 1.4 mm than that in Example 5. In view of the size of the photo film unit as large as the ID-1 type card, the frame size of Example 6 is regarded as a lower limit to be used for photographing a scene of plural people, or photographing a scene at a far distance.

According to Examples 3–6, the photo film unit has the size equal to that of the ID-1 card standardized by JIS X6301 or ISO/IEC 7810, and has the ratio of the area of the frame region to the area of the margin region equal to or more than 1.4. Consequently the photo film unit can have a frame region with such a sufficient size that, if a number of people are photographed in a single frame, each of them can be easily recognized on the obtained photographic print. Of course the entirety of the photo film unit can have such a size that the photo film unit can be handled easily and with much portability, as it can be contained in a purse or card holder. In Examples 1–6, the trap member is attached to the mask sheet with pressure-sensitive adhesive agent in a continuously extending adhering region in a straight shape. A surplus part of the developing solution, if it flows to the upside of the trap member, can be prevented from passing through the gas vents toward the outside.

It is to be noted that fixedly secured structures are used in the securing section 13 and in positions between the first bendback edge portion 16 and the mask portion of the mask sheet 12 in the embodiment of FIGS. 1–3, the heat sealing region 26 in the embodiment of FIG. 5, and in positions between the first bendback edge portion 51 and the blank space section 52 of the mask sheet 42, and in positions between the second bendback edge portion 53 and the T-space section 54, the middle sealed portions 61–63 and the weak sealed portion 64 in the embodiment of FIGS. 8–10. It is possible in any of those portions in the above embodiments to use a selected one of various securing manners which include adhesion with the pressure-sensitive adhesive agent, adhesion with hot-melt adhesive agent, adhesion with adhesive agent of any suitable type, and welding with heat or sealing with heat.

In the above embodiments, the photo film unit is the transmission type, in which the exposure surface to be exposed is different from the positive image creating surface where the positive image is created. However, the photo film unit can be the reflection type, in which a surface to be exposed is the same as a surface where the positive image is created.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A self-developing photo film unit having a photosensitive sheet, a cover sheet, a mask sheet and a trap member, said photosensitive sheet being secured to said mask sheet to close an aperture in said mask sheet, said cover sheet being opposed to said photosensitive sheet, said mask sheet having first and second edge portions bent back to wrap edges of said photosensitive sheet and said mask sheet, and having edge lines secured to said cover sheet, said trap member being secured to said first edge portion, being positioned on said photosensitive sheet and/or said mask sheet, and trapping a surplus part of developing solution spread between said photosensitive sheet and said mask sheet, said self-developing photo film unit comprising:

said trap member comprising a chip of non-woven fabric having a first and second surfaces, having porosity of 70% or more, and having acid polymer impregnated therein, said first surface having said acid polymer impregnated more than said second surface; and said first surface being positioned on said mask sheet, and having a region which is nearer to said edge line of said mask sheet and secured to said mask sheet.

2. A self-developing photo film unit as defined in claim 1, wherein said second surface has a higher porosity than said first surface.

3. A self-developing photo film unit as defined in claim 2, wherein said non-woven fabric is produced by a wet process, and includes fibres, and said fibres include 3–20 wt. % of pulp.

4. A self-developing photo film unit as defined in claim 3, wherein said self-developing photo film unit has a size of an ID-1 type card having an external size of a length varying from approximately 85.6 mm to 125 mm, a height of approximately 53.98 mm to 88.0 mm, and a thickness of approximately 0.76 mm, and a ratio of an area of said aperture to an area of a margin portion defined outside said aperture is 1.4 or more.

5. A self-developing photo film unit having a photosensitive sheet, a cover sheet, a mask sheet and a trap member, said photosensitive sheet being secured to said mask sheet to close an aperture in said mask sheet, said cover sheet being opposed to said photosensitive sheet, said mask sheet having first and second edge portions bent back to wrap edges of said photosensitive sheet and said mask sheet, and having edge lines secured to said cover sheet, said trap member being secured to said first edge portion, being positioned on said photosensitive sheet and/or said mask sheet, and trapping a surplus part of developing solution spread between said photosensitive sheet and said mask sheet, said self-developing photo film unit comprising:

said trap member comprising a chip of non-woven fabric being produced by a wet process, having a porosity of 70% or more, having acid polymer impregnated therein, and including fibres, and said fibres including 3–20 wt. % of pulp.

6. A self-developing photo film unit as defined in claim 5, wherein said fibres further include an ester type of fibres.

7. A self-developing photo film unit as defined in claim 5, wherein said self-developing photo film unit has a size of an ID-1 type card having an external size of a length varying from approximately 85.6 mm to 125 mm, a height of approximately 53.98 mm to 88.0 mm, and a thickness of approximately 0.76 mm, and a ratio of an area of said aperture to an area of a margin portion defined outside said aperture is 1.4 or more.

8. A self-developing photo film unit having a photosensitive sheet, a cover sheet, a mask sheet and a trap member, said photosensitive sheet being secured to said mask sheet to close an aperture in said mask sheet, said cover sheet being opposed to said photosensitive sheet, said mask sheet having first and second edge portions bent back to wrap edges of said photosensitive sheet and said mask sheet, and having edge lines secured to said cover sheet, said trap member being secured to said first edge portion, being positioned on said photosensitive sheet and/or said mask sheet, and trapping a surplus part of developing solution spread between said photosensitive sheet and said mask sheet, said self-developing photo film unit comprising:

said trap member comprising a strip-shaped chip and having first and second surfaces, said second surface being positioned on said mask sheet and having four side lines;

one longer side line among said four side lines being near to an edge line of said mask sheet, being attached to said mask sheet with adhesive agent.

9. A self-developing photo film unit as defined in claim 8, wherein said self-developing photo film unit has a size of an ID-1 type card having an external size of a length varying from approximately 85.6 mm to 125 mm, a height of approximately 53.98 mm to 88.0 mm, and a thickness of approximately 0.76 mm, and a ratio of an area of said aperture to an area of a margin portion defined outside said aperture is 1.4 or more.

10. A self-developing photo film unit as defined in claim 8, wherein said adhesive agent is a pressure-sensitive adhesive agent applied to said trap member.

11. A self-developing photo film unit as defined in claim 8, wherein said adhesive agent is hot-melt adhesive agent overlaid on said mask sheet.

12. A self-developing photo film unit having a photosensitive sheet, a cover sheet, a mask sheet and a trap member, said photosensitive sheet being secured to said mask sheet to close an aperture in said mask sheet, said cover sheet being opposed to said photosensitive sheet, said mask sheet having first and second edge portions bent back to wrap edges of said photosensitive sheet and said mask sheet, and having edge lines secured to said cover sheet, said trap member being secured to said first edge portion, being positioned on said photosensitive sheet and/or said mask sheet, and trapping a surplus part of developing solution spread between said photosensitive sheet and said mask sheet, said self-developing photo film unit satisfying a condition of:

$$0.5 \text{ mm} \leq D1-D3 \leq 0.8 \text{ mm}$$

where $D1$ is a range of said first edge portion while said first edge portion is substantially straightened from said mask sheet before being bent; and $D3$ is a range between said edge line of said first edge portion and a bendback line of said first edge portion while said first edge portion is bent back and secured to said mask sheet.

13. A self-developing photo film unit as defined in claim 12, wherein said self-developing photo film unit has a size of an ID-1 type card having an external size of a length varying from approximately 85.6 mm to 125 mm, a height of approximately 53.98 mm to 88.0 mm, and a thickness of approximately 0.76 mm, and a ratio of an area of said aperture to an area of a margin portion defined outside said aperture is 1.4 or more.

14. A self-developing photo film unit having a photosensitive sheet, a cover sheet, a mask sheet and a trap member, said photosensitive sheet being secured to said mask sheet to close an aperture in said mask sheet, said cover sheet being opposed to said photosensitive sheet, said mask sheet having first and second edge portions bent back to wrap edges of said photosensitive sheet and said mask sheet, and having edge lines secured to said cover sheet with gas vents remaining unattached, said trap member being secured to said first edge portion, being positioned on said photosensitive sheet and/or said mask sheet, and trapping a surplus part of developing solution spread between said photosensitive sheet and said mask sheet, said self-developing photo film unit satisfying conditions of:

$$0.65 \text{ mm} \leq D4 \leq 1.0 \text{ mm and}$$

$$1.25 \text{ mm} \leq D5 \leq 1.5 \text{ mm}$$

where $D4$ is a range of a space between said trap member and a bendback line of said first edge portion; and $D5$ is a range of a space between said edge line of said first edge portion and said trap member.

15. A self-developing photo film unit as defined in claim 14, wherein said self-developing photo film unit has a size of an ID-1 type card having an external size of a length varying from approximately 85.6 mm to 125 mm, a height of approximately 53.98 mm to 88.0 mm, and a thickness of approximately 0.76 mm, and a ratio of an area of said aperture to an area of a margin portion defined outside said aperture is 1.4 or more.

16. A self-developing photo film unit having a photosensitive sheet, a cover sheet, a mask sheet and a trap member, said photosensitive sheet being secured to said mask sheet to close an aperture in said mask sheet, said cover sheet being opposed to said photosensitive sheet, said mask sheet having first and second edge portions bent back to wrap edges of said photosensitive sheet and said mask sheet, and having edge lines secured to said cover sheet, said trap member being secured to said first edge portion, being positioned on said photosensitive sheet and/or said mask sheet, and trapping a surplus part of developing solution spread between said photosensitive sheet and said mask sheet, said self-developing photo film unit comprising:

said self-developing photo film unit having a size of an ID-1 type card having an external size of a length varying from approximately 85.6 mm to 125 mm, a height of approximately 53.98 mm to 88.0 mm, and a thickness of approximately 0.76 mm, and a ratio of an area of said aperture to an area of a margin portion defined outside said aperture is 1.4 or more.

* * * * *